July 19, 1966 T. L. HUANG 3,261,990

STAIRCASE WAVE GENERATOR USING SILICON CONTROLLED RECTIFIERS

Filed Aug. 7, 1964

INVENTOR:
THOMAS L. HUANG,

BY [signature]
HIS ATTORNEY.

United States Patent Office 3,261,990

Patented July 19, 1966

3,261,990

STAIRCASE WAVE GENERATOR USING SILICON CONTROLLED RECTIFIERS

Thomas L. Huang, Syracuse, N.Y., assignor to General Electric Company, a corporation of New York Filed Aug. 7, 1964, Ser. No. 388,222
5 Claims. (Cl. 307—88.5)

This invention relates to a staircase wave generator generally and more particularly, to a staircase wave generator utilizing silicon controlled rectifiers in the wave forming circuit.

In the past, staircase wave generators have been formed by utilizing capacitor charge or discharge through a low resistance element to obtain the voltage levels involved in the steps of the wave form. Because the voltage across the capacitor varies exponentially as the capacitor is charged or discharged, it was impossible to obtain voltage steps of equal height.

With the advent of the new voltage controlled breakdown devices, especially silicon controlled rectifiers, it became possible to provide a staircase wave generator having uniform voltage steps. However, previous circuits utilizing these voltage controlled breakdown devices have had significant disadvantages, primarily in the arrangements for sequentially firing the breakdown devices in order to form the desired wave form. Most of the arrangements for effecting such sequential firing have involved fairly complex circuitry, such as a ring counter or similar circuits, to permit sequential firing of the breakdown devices by a repetitive pulse signal.

In order to obviate the difficulties and expense involved in prior art voltage controlled breakdown device circuits used as staircase wave generators, the present invention utilizes a simplified circuit for sequentially firing a series of voltage controlled breakdown devices to form a staircase wave. This simplified circuit uses a single source of firing pulses for the voltage controlled devices and a static control for firing the devices at uniform intervals in a predetermined sequence.

Therefore, it is an object of this invention to provide an improved staircase wave generator.

Another object of this invention is to form a voltage controlled breakdown device staircase wave generator producing an output having uniform voltage steps.

A further object of this invention is to provide a voltage controlled breakdown device staircase wave generator having a decreased number of components.

Other objects and advantages of this invention will become apparent as the following description proceeds and the features of novelty which characterize the invention will be pointed out with particularity in the claims annexed to and forming part of this specification.

Briefly, in one embodiment thereof, this invention involves placing voltage controlled breakdown devices, such as silicon controlled rectifiers (SCR's) in shunt with serially-connected resistors acting as a voltage divider network, each of the SCR's being connected across a single resistor. A unijunction relaxation oscillator produces a series of firing pulses for the silicon controlled rectifiers. The repetition rate of the firing pulses is controlled by a uniformly repetitive control pulse supplied to the oscillator circuit. Firing pulses from the unijunction transistor oscillator are utilized to fire each of the SCR's in succession, thereby sequentially shorting out resistances in the voltage divider network. The output voltage of the generator is taken from the top of the voltage divider network, so that as the SCR's are successively fired to short out lower sections of the voltage divider network, the output decreases in incremental steps to provide the desired staircase wave form.

To insure that the SCR's are fired successively and to guarantee that each firing pulse fires only one SCR, a circuit comprising a pair of resistors connected as a voltage divider, a capacitor and a diode is utilized. Another unijunction transistor relaxation oscillator provides reset pulses. The rate of production of the reset pulses is dependent upon the circuit parameters of the second unijunction transistor oscillator circuit and the control pulses. The reset pulses are applied to the base of a transistor which is connected across the series-connected resistors and has a saturation voltage lower than the voltage necessary to maintain the SCR's in a conducting state. Thus, the SCR's are shut off and the circuit is reset for producing another staircase wave.

For a better understanding of this invention, reference may be made to the accompanying drawing in which.

Figure 1:
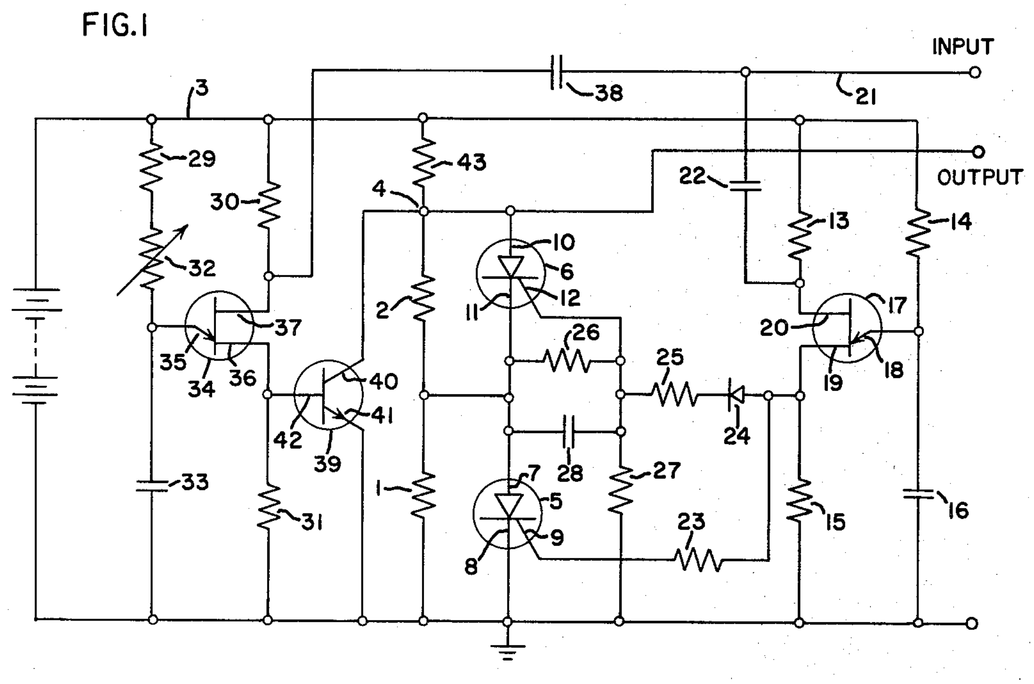
FIGURE 1 is a schematic circuit diagram of this invention.

Referring now to FIGURE 1, resistors 1 and 2 are connected in series to form a voltage divider network. A D.C. voltage is supplied to the network from line 3. The output voltage of the circuit is taken from terminal 4, at the top of the voltage divider network formed from resistors 1 and 2.

Voltage controlled breakdown devices, such as silicon controlled rectifiers (SCR's) 5 and 6 are connected across the individual resistors. In this particular embodiment SCR 5 is connected across resistor 1 and SCR 6 is connected across resistor 2. Each of the SCR's have an anode (7, 10), a cathode (8, 11) and a gate electrode (9, 12). The SCR's are connected across the resistors with the anode on one side and the cathode on the other. SCR's 5 and 6 are placed in a conducting state by firing pulses produced on gate electrodes 9 and 12, respectively.

Firing pulses for SCR's 5 and 6 are produced by a relaxation oscillator circuit including resistors 13, 14, 15, capacitor 16 and a unijunction transistor 17 having an emitter 18, a base 19 (known as base-one in the art) and a base 20 (known as base-two in the art). A signal composed of negative going uniformly repetitive control pulses is introduced on lead 21. This series of pulses (not shown) is applied to base 20 of unijunction transistor 17 through capacitor 22.

The firing pulses produced at base 19 of unijunction transistor 17 are applied to gate 9 of SCR 5 through resistor 23. The same firing pulses are applied to gate 12 of SCR 6 through diode 24 and resistor 25. In order to prevent firing of SCR 6 by the same firing pulse that fires SCR 5, the voltage divider network comprising resistors 26 and 27 is connected between cathode 11 of SCR 6 and ground to back-bias diode 24. The series connection of diode 24 and resistor 25 is connected from base 19 of unijunction transistor 17 and the midpoint of the voltage divider network composed of resistors 26 and 27. As SCR 5 is to be fired first and its cathode 8 is already grounded, there is no need for the circuit including diode 24, resistors 26 and 27 and capacitor 28 to be used in conjunction with this SCR. In order to prevent "slave" firing of SCR 6 upon firing of SCR 5, capacitor 28 is connected between cathode 11 and gate 12 of SCR 6.

Resetting of the circuit after the desired number of voltage steps is achieved through the production of a reset signal by the relaxation oscillator circuit comprising resistors 29, 30 and 31, potentiometer 32, capacitor 33, and unijunction transistor 34. Unijunction transistor 34 has an emitter 35 and base 36 (base-one) and a base 37 (base-two). Again, the rate of repetition of the reset pulses is controlled by the negative-going, uniformly repetitive control pulse applied to base 37 of unijunction transistor 34 from lead 21 through capacitor 38. The output reset pulses appearing at base 36 of unijunction transistor 34 are applied to transistor 39. Transistor 39 has a collector 40, an emitter 41 and a base 42. Base 42 of transistor 39 is connected to base 36 of unijunction transistor 34. Collector 40 of transistor 39 is connected to the output terminal 4 and emitter 39 is connected to ground, so that transistor 39 is in parallel with the series-connected resistors 1 and 2 and silicon controlled rectifiers 5 and 6.

An additional resistor 43 is connected between line 3 and terminal 4. Resistor 43 serves to limit the current through SCR's 5 and 6 when both are in a conducting state, and to provide a dropping resistor in series with the voltage divider network.

Figure 2:
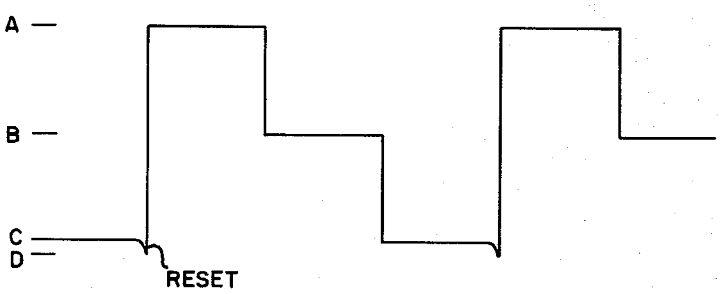
FIGURE 2 is a representation of the wave form produced by this invention.

The operation of the circuit of this invention will now be described with the aid of FIGURE 2. A D.C. voltage is applied to the circuit through the line 3. This voltage is applied across the voltage divider network comprising resistors 1 and 2. Initially, the highest level output is realized at the output terminal 4, indicated as level A in FIGURE 2.

D.C. voltage from line 3 also promotes oscillation of the relaxation oscillator formed by resistors 13, 14, 15, capacitor 16 and unijunction transistor 17. Capacitor 16 is charged through resistor 14, and charging rate depending upon the value chosen for resistor 14. In normal operation, as the capacitor charges to a voltage sufficient to initiate emitter-base conduction in unijunction transistor 17 there is a discharge of capacitor 16 through emitter 18 and base 19. To prevent variations of the frequency of the pulse, a negative going pulse is obtained from line 21 and applied through capacitor 22 to base 20 of unijunction transistor 17. This pulse lowers the voltage on base 20, initiating emitter-base conduction and thereby discharge of capacitor 16, so that the firing pulses appearing at base 19 of unijunction transistor 17 are controlled by the pulses from line 21.

The first firing pulse appearing at base 19 is applied directly to gate 9 of SCR 5 through resistor 23. This promotes conduction of SCR which provides a bypass path about resistor 1 and brings cathode 11 of SCR 6 essentially to ground potential. As a result, the voltage at the output terminal 4 is reduced to level B in FIGURE 2, since the total resistance of the circuit is decreased and the current must therefore increase. Increasing the current through resistors 2 and 43 causes an increased voltage drop across resistor 43 and the subsequent reduction of output voltage. Thus, the first step of the staircase wave form is from voltage level A to level B.

The rapid approach to ground potential of cathode 11 of SCR 6 would, if uncorrected, produce "slave" firing. The term "slave" firing indicates only that SCR 6 would be fired in a following or "slave" manner as a result of the firing of SCR 5. To prevent this occurrence, capacitor 28 has been added to the circuit. Prior to firing of SCR 5, capacitor 28 has been charged to the voltage drop across resistor 26. As cathode 11 of SCR 6 approaches ground potential capacitor 28 attempts to discharge, but due to its finite discharge time it maintains gate 12 negative with respect to cathode 11 of SCR 6 for the short duration of time necessary to prevent slave firing.

The firing pulse applied to gate 9 of SCR 5 is also applied to the anode of the diode 24. Prior to the time when SCR 5 has been fired, the voltage divider network of resistors 26 and 27 provides a bias through resistor 25 to the cathode of diode 24 to prevent conduction through the diode. After SCR 5 has fired, the midpoint between resistors 26 and 27 is essentially at ground potential so that the bias is removed from diode 24. Thus, the next firsing pulse appearing at base 19 of unijunction transistor 17 is applied to gate 12 of SCR 6 through diode 24 and resistor 25. This initiates firing of SCR 6 and makes the potential at output terminal 4 approach ground potential, except for the voltage drops across SCR 5 and SCR 6, which may be considered negligible for most purposes. Therefore, the second step of the wave form is from voltage level B to that indicated as level C, which is just the voltage drop across the SCR's.

Now that the voltage steps (in this case two) have been realized, it is necessary to reset the SCR's so that the staircase wave form may be repeated. Reset pulses are achieved from the unijunction transistor oscillator including unijunction transistor 34 which functions in the same manner as the unijunction transistor oscillator previously described. However, an additional element, potentiometer 32, has been added to the circuit. Variation of the resistance of potentiometer 32 permits the charging of capacitor 33 to control the number of output pulses from base 36 to be an integral division of the number of pulses applied to base 37. In this case it would be desired to have a reset pulse occurring on every third pulse obtained from line 21. When the reset pulse is obtained, it is applied to base 42 of transistor 39 to initiate conduction of the transistor and drive it into saturation. As transistor 39 has been chosen to have a saturation emitter-collector voltage less than the voltage necessary to maintain SCR's 5 and 6 in conduction, the voltage across SCR's 5 and 6 is decreased to a point that conduction ceases, and the SCR's are reset for another operation. This voltage decrease is indicated by the "pips" in FIGURE 2, having a peak defined as level D.

While the description of this invention has been limited to the circuit shown in the drawing, which produces a two-step staircase wave form, it should be realized that additional steps may be added relatively simply. To add additional steps, additional resistors are placed in series between resistors 2 and 43. Output terminal 4 remains at the top of the voltage divider network, or at the bottom of resistor 43. Additional SCR's are connected across the resistors in the same manner that SCR 6 is connected across resistor 2. Additional elements corresponding to diode 24, resistors 25, 26, 27 and capacitor 28 are connected in the SCR circuits. The anodes of the additional diodes are connected to base 19 of unijunction transistor 17, as is the anode of diode 24. Voltage dividers corresponding to that formed by resistors 26 and 27 are connected from the cathodes of the SCR's to ground.

In operation, each of the additional steps of the wave form is formed in the manner given in the description of the operation of SCR 6 and its associated circuitry. The only other change that is necessary is to adjust potentiometer 32 to provide the more widely displaced reset pulses required for obtaining the additional steps of the wave form.

While this invention has been described with respect to a particular embodiment thereof, it will be understood that the invention is not limited thereto and that many modifications will occur to those skilled in the art. It is therefore desired that the appended claims will cover all modifications included within the spirit and scope of the invention.

What is claimed is:

1. A staircase wave generator comprising:

a source of unidirectional potential, a plurality of resistors serially connected across said source, a plurality of current control devices, each having a pair of terminals between which substantially no conduction occurs at one voltage thereacross and between which substantial conduction occurs at another voltage substantially lower than said one voltage, each of said devices connected across a respective resistor, means for rendering each of said devices conductive in sequence in response to a respective pulse of voltage in a sequence of pulses of voltage, means in circuit across said plurality of serially connected controlled devices for dropping the voltage thereacross to a value less than the value which maintains conduction therethorugh at the completion of the sequence of rendering said devices conductive.

2. A staircase wave generator comprising:
a source of unidirectional potential,
a plurality of resistors serially connected,
a plurality of current control devices, each having a pair of terminals between which substantially no conduction occurs at one voltage thereacross and between which substantial conduction occurs at another voltage substantially lower than said one voltage,
a current limiting impedance,
said impedance and said plurality of serially connected resistors connected in series across said source,
each of said devices connected across a respective resistor,
means for rendering each of said devices conductive in sequence in response to a respective pulse of voltage in a sequence of periodic pulses of voltage,
means in circuit across said plurality of serially connected controlled devices for dropping the voltage thereacross to a value less than the value which maintains conduction therethrough at the completion of the sequence of rendering said devices conductive.

3. A staircase wave generator comprising:
a source of unidirectional potential,
a plurality of resistors serially connected,
a plurality of silicon controlled rectifiers, each having a cathode, an anode and a control electrode,
a current limiting impedance,
said impedance and said plurality of serially connected resistors connected in series across said source,
each of said devices connected across a respective resistor with the anode of one controlled rectifier connected to the cathode of an adjacent controlled rectifier,
means for applying to the control electrodes of each of said rectifiers a respective pulse of voltage in a sequence of pulses of voltage to render said rectifiers conductive in sequence,
means in circuit across said plurality of serially connected controlled rectifiers for dropping the voltage thereacross to a value less than the value which maintains conduction therethrough at the completion of the sequence of rendering said controlled rectifiers conductive.

4. A staircase wave generator comprising:
a source of unidirectional potential having a positive terminal and a negative terminal,
a plurality of resistors serially connected,
a plurality of silicon controlled rectifiers, each having a cathode, an anode and a control electrode,
a current limiting impedance,
said impedance and said plurality of serially connected resistors connected in series across said source,
each of said devices connected across a respective resistor with the anode of one controlled rectifier connected to the cathode of an adjacent controlled rectifier,
means for applying to the control electrodes of each of said rectifiers a respective pulse of voltage in a sequence of pulses of voltage to render said rectifiers conductive in sequence,
means for insuring that each pulse in said sequence of pulses renders only a respective controlled rectifier conductive including a resistor and a capacitor in shunt connected in series with another resistor between the cathode of each controlled rectifier and said negative terminal in the order named,
means in circuit across said plurality of serially connected controlled rectifiers for dropping the voltage thereacross to a value less than the value which maintains conduction therethrough at the completion of the sequence of rendering said controlled rectifiers conductive.

5. A staircase wave generator comprising:
a source of unidirectional potential,
a plurality of resistors serially connected,
a plurality of silicon controlled rectifiers, each having a cathode, an anode and a control electrode,
a current limiting impedance,
said impedance and said plurality of serially connected resistors connected in series across said source,
each of said controlled rectifiers connected across a respective resistor with the anode of one controlled rectifier connected to the cathode of an adjacent controlled rectifier,
means for applying to the control electrodes of each of said rectifiers a respective pulse of voltage in a sequence of pulses of voltage to render said rectifiers conductive in sequence,
a transistor having input circuit and output circuit, the output circuit being connected across said plurality of serially connected resistors and having a high impedance when no pulses are applied to the input circuit thereof and a low impedance when pulses are applied to the input circuit, said low impedance being of a value less than the aggregate impedance of the serially connected controlled rectifiers when all of said controlled rectifiers are in the conductive state.

References Cited by the Examiner

UNITED STATES PATENTS

| | | | |
|---|---|---|---|
| 2,492,850 | 12/1949 | De Mers. | |
| 2,562,694 | 7/1951 | Brown | 328—28 |
| 2,683,219 | 7/1954 | Mohr | 331—14 |
| 3,047,789 | 7/1962 | Lowry | 321—18 |
| 3,061,747 | 10/1962 | Shlicher | 310—95 |
| 3,100,268 | 8/1963 | Foote | 307—88.5 |

References Cited by the Applicant

UNITED STATES PATENTS

| | | |
|---|---|---|
| 3,100,851 | 8/1963 | Ross et al. |

ARTHUR GAUSS, *Primary Examiner.*

DAVID J. GALVIN, S. D. MILLER, *Assistant Examiners.*